United States Patent
Langlotz et al.

(10) Patent No.: US 10,035,729 B2
(45) Date of Patent: Jul. 31, 2018

(54) INORGANIC BINDER COMPOSITION COMPRISING A COPOLYMER

(71) Applicant: BASF SE, Ludwigshafen am Rhein (DE)

(72) Inventors: Björn Langlotz, Trostberg (DE); Thomas Gastner, Wald (DE); Torben Gädt, Traunstein (DE); Oliver Mazanec, Rosenheim (DE); Michael Schinabeck, Altenmarkt (DE); Diana Eissmann, Tacherting (DE); Stefan Friedrich, Garching (DE)

(73) Assignee: BASF SE, Ludwigshafen (DE)

( * ) Notice: Subject to any disclaimer, the term of this patent is extended or adjusted under 35 U.S.C. 154(b) by 57 days.

(21) Appl. No.: 15/318,033

(22) PCT Filed: Jun. 12, 2015

(86) PCT No.: PCT/EP2015/063188
§ 371 (c)(1),
(2) Date: Dec. 12, 2016

(87) PCT Pub. No.: WO2015/189396
PCT Pub. Date: Dec. 17, 2015

(65) Prior Publication Data
US 2017/0129812 A1    May 11, 2017

(30) Foreign Application Priority Data
Jun. 12, 2014  (EP) .................... 14172088

(51) Int. Cl.
C04B 24/26    (2006.01)
C04B 28/16    (2006.01)
C04B 24/32    (2006.01)
C04B 40/00    (2006.01)
C08F 220/58   (2006.01)
C04B 103/00   (2006.01)
C04B 111/62   (2006.01)

(52) U.S. Cl.
CPC .......... C04B 24/2652 (2013.01); C04B 24/32 (2013.01); C04B 28/16 (2013.01); C04B 40/0039 (2013.01); C08F 220/58 (2013.01); *C04B 2103/0079* (2013.01); *C04B 2111/62* (2013.01); *C08F 2220/585* (2013.01); *C08F 2800/20* (2013.01)

(58) Field of Classification Search
CPC . C04B 24/2652; C04B 24/32; C04B 40/0039; C04B 28/16; C04B 2111/62; C04B 2103/0079; C08F 220/58; C08F 2800/20; C08F 2220/585
See application file for complete search history.

(56) References Cited

U.S. PATENT DOCUMENTS

| | | | |
|---|---|---|---|
| 4,349,386 A | 9/1982 | Davidovits | |
| 4,472,199 A | 9/1984 | Davidovits | |
| 4,509,985 A | 4/1985 | Davidovits | |
| 5,705,553 A * | 1/1998 | Kuropka | C04B 24/2641 524/459 |
| 5,770,760 A | 6/1998 | Robinson | |
| 5,874,495 A | 2/1999 | Robinson | |
| 6,294,015 B1 * | 9/2001 | Yamashita | C04B 24/2647 106/724 |
| 6,919,388 B2 | 7/2005 | Nishikawa et al. | |
| 7,238,760 B2 | 7/2007 | Shinabeck et al. | |
| 7,368,488 B2 | 5/2008 | Nishikawa et al. | |
| 7,605,198 B2 | 10/2009 | Shinabeck et al. | |
| 8,524,649 B2 | 9/2013 | Leyrer et al. | |
| 8,853,999 B2 | 10/2014 | Haddad et al. | |
| 2003/0087993 A1 | 5/2003 | Nishikawa et al. | |
| 2004/0024154 A1 | 2/2004 | Shinabeck et al. | |
| 2004/0225093 A1 * | 11/2004 | Tomita | C04B 24/163 526/240 |
| 2007/0173568 A1 | 7/2007 | Nishikawa et al. | |
| 2009/0131560 A1 * | 5/2009 | Ono | C04B 24/2647 524/5 |
| 2011/0230387 A1 | 9/2011 | Leyrer et al. | |

(Continued)

FOREIGN PATENT DOCUMENTS

| | | |
|---|---|---|
| CA | 2 760 734 A1 | 11/2010 |
| DE | 100 37 629 A1 | 2/2002 |
| DE | 10 2004 032 304 A1 | 2/2006 |
| EP | 0 705 854 A1 | 4/1996 |
| EP | 1 308 427 A1 | 5/2003 |
| WO | WO 85/03699 | 8/1985 |
| WO | WO 2004/099100 A1 | 11/2004 |
| WO | WO 2009/019225 A2 | 2/2009 |
| WO | WO 2010/133527 A2 | 11/2010 |

OTHER PUBLICATIONS

PCT/EP2015/063188—International Search Report, dated Sep. 1, 2015. English Translation.
PCT/EP2015/063188—International Written Opinion, dated Sep. 1, 2015.
Roussel, N., et al., "From Mini-Cone Test to Abrams Cone Test: Measurement of Cement-Based Materials Yield Stress Using Slump Tests", Cement and Concrete Research, 2005, pp. 817-822, vol. 35, No. 5.

*Primary Examiner* — Robert Jones, Jr.
(74) *Attorney, Agent, or Firm* — Curatolo Sidoti Co., LPA; Joseph G. Curatolo; Salvatore A. Sidoti

(57) ABSTRACT

The present invention relates to a composition comprising (α) at least one inorganic binder and (β) at least one water-soluble copolymer based on (a) 0.1 to 20 wt % of at least one monomer of the formula (I) and (b) 25 to 99.9 wt % of at least one hydrophilic monomer (b) which is different from monomer (a), where the at least one copolymer has a molar mass average M of 1 500 000 to 30 000 000 g/mol. Furthermore, a process for producing this composition is disclosed. A further aspect of the present invention is the use of the copolymer of component (β) as rheological additive in a composition of the invention.

15 Claims, No Drawings

(56) References Cited

U.S. PATENT DOCUMENTS

2015/0002094 A1 1/2015 Haddad et al.
2016/0144735 A1 5/2016 Haddad et al.

* cited by examiner

INORGANIC BINDER COMPOSITION COMPRISING A COPOLYMER

CROSS REFERENCE TO RELATED APPLICATIONS

This application is a national stage application of International Application No. PCT/EP2015/063188, filed 12 Jun. 2015, which claims priority from European Patent Application No. 14172088.8, filed 12 Jun. 2014, which applications are incorporated herein by reference.

The present invention relates to compositions comprising at least one inorganic binder and at least one specific water-soluble copolymer. Furthermore, a process for producing this composition is disclosed. A further aspect of the present invention is the use of the specific copolymer as rheological additive in a composition of the invention.

Water-soluble polymers having a thickening action are used in many fields of industry, for example in the field of cosmetics, in foodstuffs, for producing cleaners, printing inks, emulsion paints, in crude oil recovery or in construction chemicals.

Water-soluble nonionic derivatives of polysaccharides, in particular cellulose and starch derivatives, are routinely used in aqueous building material mixtures in order to prevent the undesirable evaporation of the water which is necessary for hydration and processability and also to control segregation, sedimentation and bleeding (separation of water on the surface) of the system.

According to Ullmann's Enzyklopädie der Technischen Chemie (4th edition, volume 9, pages 208-210, Verlag Chemie Weinheim), the most widely used rheological additives are synthetically produced nonionic cellulose and starch derivatives such as methylcellulose (MC), hydroxyethylcellulose (HEC), methylhydroxyethylcellulose (MHEC), methylhydroxypropylcellulose (MHPC). However, microbially produced polysaccharides such as welan gum, diutan gum and naturally occurring extractively isolated polysaccharides (hydrocolloids), such as alginates, xanthans, carrageenans, galactomannans, etc., are also used in the prior art for regulating the rheology of aqueous building material systems and paint systems.

Many chemically different classes of polymers which can be used as rheological additives in aqueous inorganic building material mixtures are known. One important class of polymers having a stabilizing action are hydrophobically associating polymers. These are, as a person skilled in the art will know, water-soluble polymers which have lateral or terminal hydrophobic groups, for example relatively long alkyl chains. In aqueous solution, such hydrophobic groups can associate with themselves or with other substances having hydrophobic groups. This forms an associative network by means of which the medium is stabilized.

EP 705 854 A1, DE 100 37 629 A1 and DE 10 2004 032 304 A1 disclose water-soluble, hydrophobically associating copolymers and their use, for example in the field of construction chemicals. The copolymers described comprise acidic monomers such as acrylic acid, vinylsulfonic acid, acrylamidomethylpropanesulfonic acid, basic monomers such as acrylamide, dimethylacrylamide or monomers comprising cationic groups, for example monomers having ammonium groups. Such monomers give the polymers their solubility in water. As hydrophobically associating monomers, the copolymers disclosed in each case comprise monomers of the following type: $H_2C=C(R^x)-COO-(-CH_2-CH_2-O-)_q$-Ry or $H_2C=C(R^x)-O-(-CH_2-CH_2-O-)_q-R^y$ where $R^x$ is typically H or $CH_3$ and $R^y$ is a relatively large hydrocarbon radical, typically hydrocarbon radicals having 8 to 40 carbon atoms. The documents mention, for example, relatively long alkyl groups or a tristyrylphenyl group.

Furthermore, U.S. Pat. No. 8,362,180 relates to water-soluble copolymers which comprise hydrophobically associating monomers. The monomers comprise an ethylenically unsaturated group and also a polyether group having a block structure composed of a hydrophilic polyalkylene oxide block which consists essentially of ethylene oxide groups and a terminal, hydrophobic polyalkylene oxide block which consists of alkylene oxides having at least 4 carbon atoms, preferably at least 5 carbon atoms.

Furthermore, the use of these hydrophobically associating copolymers in aqueous building material compositions is disclosed.

WO 2004/099100 discloses cement additives comprising a polycarboxylic acid polymer having a polyether side chain having an EO/PO/EO triblock structure. The EO blocks may have 1 to 200 repeat units, while the PO block is an alkylene oxide unit having 3 to 18 carbon atoms and 1 to 50 repeat units. The examples describe polymers having a weight-average molecular weight of 8500 to 40 500 g/mol. The description discloses a weight-average molecular weight of the polycarboxylic acid polymers of not more than 1 000 000 g/mol. The cement additives are said to bring about a high reduction in water and an improvement in viscosity.

Although many of the hydrophobically associating copolymers known from the prior art are very good stabilizers for aqueous inorganic building material compositions, they have the disadvantage that they adversely affect the flowability of the aqueous inorganic building material compositions.

It was therefore an object of the present invention to provide inorganic binder compositions which display a very low tendency to undergo sedimentation, segregation and bleeding and should at the same time have very good flow properties.

This object has been achieved by a composition comprising (α) at least one inorganic binder
(β) at least one water-soluble copolymer based on
  (a) 0.1 to 20 wt % of at least one monomer of the formula (I),

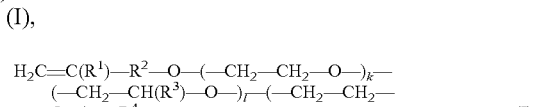

(I)

where the units $-(-CH_2-CH_2-O-)_k$, $-(-CH_2-CH(R^3)-O-)_l$ and $-(-CH_2-CH_2-O-)_m$ are arranged in a block structure in the order shown in formula (I) and the radicals have the following meanings:

k: is from 10 to 150;
l: is from 5 to 25;
m: is from 1 to 15;
$R^1$: is H or methyl;
the radicals $R^2$: are each, independently of one another, a single bond or a divalent, linking group selected from the group consisting of $-(C_nH_{2n})-$ and $-O-(C_nH_{2n'})-$ and $-C(O)-O-(C_{n''}H_{2n''})-$, where n, n' and n'' are each a natural number from 1 to 6;
$R^3$: is a hydrocarbon radical having at least 2 carbon atoms or an ether group of the general formula $-CH_2-O-R^{3'}$, where $R^{3'}$ is a hydrocarbon radical having at least 2 carbon atoms and the radicals $R^3$ can be identical or different within the group $-(-CH_2-$ $CH(R^3)-O-)_l$; preferably with the proviso that the sum of the carbon atoms of all hydrocarbon radicals $R^3$ within the group $-(-CH_2-CH(R^3)-O-)_l$ is in the range from 14 to 50;

the radicals $R^4$: are each, independently of one another, H or a hydrocarbon radical having 1 to 4 carbon atoms, and (b) 25 to 99.9 wt % of at least one monoethylenically unsaturated, hydrophilic monomer (b) different from monomer (a), where the wt % figures are in each case based on the total amount of all monomers in the copolymer and the at least one copolymer has a molar mass average M of 1 500 000 to 30 000 000 g/mol which is determined by the Mark-Houwink relationship (1)

$$M=([\eta]/K)^{1/\alpha} \quad (1),$$

where K=0.0049, α=0.8 and [η] is the intrinsic viscosity.

It has surprisingly been found here that the copolymers of the invention not only completely achieve the stated object but can also frequently be used in smaller amounts compared to the prior art.

In particular, the composition of the invention comprises, based on its dry mass, at least 20 wt %, preferably at least 40 wt %, in particular from 30 to 99.9995 and more preferably from 35 to 55 wt %, of the at least one inorganic binder and 0.0005 to 5 wt %, preferably 0.0005 to 2 wt % more preferably 0.001 to 1 wt %, of the at least one copolymer.

In a preferred embodiment, the invention relates to copolymers of the invention in which the index k in monomer (a) of the formula (I) is from 23 to 26.

In a further preferred embodiment, the invention relates to copolymers of the invention in which the index I in monomer (a) of the formula (I) is from 8.5 to 17.25.

In a preferred embodiment, the total sum of the monomers (a) and (b) in the copolymer of the invention is 100 wt %.

The monomer (a) is preferably exclusively a monomer of the general formula (I) as described above.

The following details are provided in respect of the invention:

The copolymers of the invention of component (β) are water-soluble copolymers which have hydrophobic groups. In aqueous compositions, the hydrophobic groups can associate with themselves or with the hydrophobic groups of other materials and as a result of these interactions they thicken the aqueous composition.

A person skilled in the art will know that the solubility in water of hydrophobically associating copolymers can be more or less strongly dependent on the pH, depending on the type of monomers used. The reference point for assessment of solubility in water should therefore in each case be the pH desired for the respective use of the copolymer.

For the purpose of the present patent application, the term "water-soluble copolymer" refers to copolymers which have a solubility in water at 20° C. and atmospheric pressure and the pH of the inventive composition in question of at least 1 gram per liter of water, in particular at least 10 grams per liter of water and particularly preferably at least 100 grams per liter of water.

The copolymer of the invention comprises at least one monoethylenically unsaturated monomer (a) which gives the copolymer of the invention hydrophobically associating properties.

According to the invention, the at least one monomer (a) is a monomer of the general formula (I)

$$H_2C=C(R^1)-R^2-O-(-CH_2-CH_2-O-)_k-$$
$$(-CH_2-CH(R^3)-O-)_l-(-CH_2-CH_2-$$
$$O-)_m-R^4 \quad (I).$$

In the monomers (a) of the general formula (I), an ethylenic group $H_2C=C(R^1)-$ is joined via a divalent, linking group $-R^2-O-$ to a polyalkylenoxy radical having the block structure $-(-CH_2-CH_2-O-)_k-(-CH_2-CH(R^3)-O-)_l-(-CH_2-CH_2-O-)_mR^4$, where the blocks $-(-CH_2-CH_2-O-)_k$, $-(-CH_2-CH(R^3)-O-)_l$ and $-(-CH_2-CH_2-O-)_m$ are arranged in the order shown in formula (I). The monomers (a) have either a terminal OH group or a terminal ether group $OR^4$.

In the abovementioned formula, $R^1$ is H or a methyl group. $R^1$ is preferably H.

$R^2$ is a single bond or a divalent, linking group selected from among the groups $-(C_nH_{2n})-$, $-O-(C_nH_{2n'})-$ and $-C(O)-O-(C_{n''}H_{2n''})-$. In the formulae mentioned, n, n' and n'' are each a natural number from 1 to 6. In other words, the linking group is a straight-chain or branched aliphatic hydrocarbon group having 1 to 6 carbon atoms which is linked either directly or via an ether group $-O-$ or a carboxylic ester group $-C(O)-O-$ to the ethylenic group $H_2C=C(R^1)-$. The groups $-(C_nH_{2n})-$, $-(C_nH_{2n'})-$ and $-(C_{n''}H_{2n''})-$ are preferably linear aliphatic hydrocarbon groups.

The group $R^2=-(C_nH_{2n})-$ is preferably selected from among $-CH_2-$, $-CH_2-CH_2-$ and $-CH_2-CH_2-CH_2-$; particular preference is given to a methylene group $-CH_2-$.

The group $R^2=-O-(C_{n'}H_{2n'})-$ is preferably a group selected from among $-O-CH_2-CH_2-$, $-O-CH_2-CH_2-CH_2-$ and $-O-CH_2-CH_2-CH_2-CH_2-$; particular preference is given to $-O-CH_2-CH_2-CH_2-CH_2-$.

The group $R^2=-C(O)-O-(C_{n''}H_{2n''})-$ is preferably a group selected from among $-C(O)-O-CH_2-$, $-C(O)-O-CH_2-CH_2-$ and $-C(O)-O-CH_2-CH_2-$; particular preference is given to $-C(O)-O-CH_2-CH_2-$.

The group $R^2$ is particularly preferably a group $-O-(C_nH_{2n'})-$.

$R^2$ is more particularly preferably a group selected from among $-CH_2-$ or $-O-CH_2-CH_2-CH_2-CH_2-$ or $-C(O)-O-CH_2-CH_2-$; very particular preference is given to $-O-CH_2-CH_2-CH_2-CH_2-$.

The monomers (a) also have a polyalkylenoxy radical which consists of the units $-(-CH_2-CH_2-O-)_k$, $-(-CH_2-CH(R^3)-O-)_l$ and $-(-CH_2-CH_2-O-)_m$, where the units are arranged in the order shown in formula (I) in a block structure. The transition between the blocks can be abrupt or continuous.

The number of ethylenoxy units k is from 10 to 150, preferably from 12 to 50, especially preferably from 15 to 35 and particularly preferably from 20 to 30.

The number of ethylenoxy units k is very particularly preferably from 23 to 26. The numbers mentioned are always averages of distributions.

In the second block $-(-CH_2-CH(R^3)-O-)_l-$, the radicals $R^3$ are, independently of one another, hydrocarbon radicals having at least 2 carbon atoms, preferably 2 to 14 carbon atoms, especially preferably 2 to 4 and particularly preferably 2 or 3 carbon atoms. The hydrocarbon radicals can each be an aliphatic and/or aromatic, linear or branched carbon radical. Preference is given to aliphatic radicals. Particular preference is given to an aliphatic, unbranched hydrocarbon radical having 2 or 3 carbon atoms. The block mentioned is preferably a polybutylenoxy block or a polypentylenoxy block.

Examples of suitable radicals $R^3$ comprise ethyl, n-propyl, n-butyl, n-pentyl, n-hexyl, n-heptyl, n-octyl, n-nonyl and n-decyl, n-dodecyl, n-tetradecyl and also phenyl.

Examples of suitable radicals $R^3$ comprise ethyl, n-propyl, n-butyl, n-pentyl, n-hexyl, n-heptyl, n-octyl, n-nonyl and n-decyl and also phenyl. Examples of preferred radicals comprise n-propyl, n-butyl, n-pentyl, with particular preference being given to an ethyl radical or an n-propyl radical.

The radicals $R^3$ can also be ether groups of the general formula —$CH_2$—O—$R^{3'}$, where $R^{3'}$ is an aliphatic and/or aromatic, linear or branched hydrocarbon radical having at least 2 carbon atoms, preferably 2 to 10 carbon atoms and particularly preferably at least 3 carbon atoms. Examples of radicals $R^{3'}$ comprise n-propyl, n-butyl, n-pentyl, n-hexyl, 2-ethylhexyl, n-heptyl, n-octyl, n-nonyl, n-decyl and phenyl.

Examples of radicals $R^{3'}$ comprise n-propyl, n-butyl, n-pentyl, n-hexyl, 2-ethylhexyl, n-heptyl, n-octyl, n-nonyl, n-decyl, n-dodecyl, n-tetradecyl and phenyl.

The block —(—$CH_2$—$CH(R^3)$—O—)$_l$— is thus a block consisting of alkylenoxy units having at least 4 carbon atoms, preferably 4 or 5 carbon atoms, and/or of glycidyl ethers with an ether group having at least 2, preferably at least 3, carbon atoms. As radicals $R^3$, preference is given to the abovementioned hydrocarbon radicals; the building blocks of the second block are particularly preferably alkylenoxy units comprising at least 4 carbon atoms, such as butylenoxy and pentylenoxy units or units of higher alkylene oxides; very particular preference is given to butylene oxide or pentylenoxy units.

To a person skilled in the art of polyalkylene oxides it is clear that the orientation of the hydrocarbon radicals $R^3$ can depend on the conditions in the alkoxylation, for example on the catalyst selected for the alkoxylation. The alkylenoxy groups can thus be built into the monomer in the —(—$CH_2$—$CH(R^3)$—O—)— orientation or else the inverse orientation —(—$CH(R^3)$—$CH_2$—O—)—. The depiction in formula (I) should therefore not be regarded as being restricted to a particular orientation of the group $R^3$.

The number of alkylenoxy units l is from 5 to 25, in particular from 6 to 23, particularly preferably from 7 to 20, very particularly preferably from 8.5 to 17.25. The sum of the carbon atoms in all hydrocarbon radicals $R^3$ within the group —(—$CH_2$—$CH(R^3)$—O—)$_l$ is preferably from 14 to 50, preferably from 18 to 40, particularly preferably from 25.5 to 34.5. If the radicals $R^3$ are ether groups —$CH_2$—O—$R^{3'}$, the sum of the hydrocarbon radicals of $R^{3'}$ within the group —(—$CH_2$—$CH(R^{3'})$—O—)$_l$ is from 14 to 50, preferably from 18 to 40, particularly preferably from 25.5 to 34.5, with the carbon atom of the linking —$CH_2$—O— group in —$CH_2$—O—$R^{3'}$ not being taken into account.

A preferred embodiment is an above-described copolymer comprising a monomer (a) in which $R^3$ is ethyl and l is from 7.5 to 25, preferably from 12.75 to 25, particularly preferably from 13 to 23, very particularly preferably from 12.75 to 17.25; for example, 14, 16 or 22.

The number of alkylenoxy units l is, in a preferred embodiment, from 8.5 to 17.25, in particular with the proviso that the sum of the carbon atoms in all hydrocarbon radicals $R^3$ is in the range from 25.5 to 34.5. If the radicals $R^3$ are ether groups —$CH_2$—O—$R^{3'}$, it is, in particular, a proviso that the sum of the hydrocarbon radicals $R^{3'}$ is in the range from 25.5 to 34.5, with the carbon atom of the linking —$CH_2$—O— group in —$CH_2$—O—$R^{3'}$ not being taken into account. A preferred embodiment relates to an above-described copolymer comprising a monomer (a) in which $R^3$ is ethyl and l is from 12.75 to 17.25, in particular from 13 to 17, for example 14 or 16. A further preferred embodiment relates to an above-described copolymer comprising a monomer (a) in which $R^3$ is n-propyl and l is from 8.5 to 11.5, preferably from 9 to 11, for example 10 or 11. As mentioned already, the stated numbers are averages of distributions.

The block —(—$CH_2$—$CH_2$—O—)$_m$ is a polyethylenoxy block. The number of ethylenoxy units m is from 1 to 15, preferably from 0.1 to 10, particularly preferably from 0.1 to 5, especially preferably from 0.5 to 5 and very particularly preferably from 2 to 5. The numbers mentioned are once again averages of distributions.

The radical $R^4$ is H or a preferably aliphatic hydrocarbon radical having 1 to 4 carbon atoms. $R^4$ is preferably H, methyl or ethyl, particularly preferably H or methyl and very particularly preferably H.

It will be clear to a person skilled in the art of polyalkylenoxy block copolymers that the transition between the blocks can, depending on the production method, be abrupt or continuous. In the case of a continuous transition, there is a transition zone between the blocks which comprises monomers of both blocks. If the block boundary is fixed at the middle of the transition zone, the first block —(—$CH_2$—$CH_2$—O—)$_k$ can accordingly have small amounts of units —(—$CH_2$—$CH(R^3)$—O—)— and the second block —(—$CH_2$—$CH(R^3)$—O—)$_l$ can have small amounts of units —(—$CH_2$—$CH_2$—O—)—, where these units are, however, not randomly distributed over the block but are instead arranged in said transition zone. In particular, the third block (—$CH_2$—$CH_2$—O—)$_m$ can have small amounts of units —(—$CH_2$—$CH(R^3)$—O—)—.

For the purposes of the present invention, block structure means that the blocks are made up of the respective units to an extent of at least 85 mol %, preferably at least 90 mol %, particularly preferably at least 95 mol %, based on the total molar amount of the respective block. This means that the blocks can comprise, apart from the named units, small amounts of other units (in particular other polyalkylenoxy units). In particular, the polyethylenoxy block —(—$CH_2$—$CH_2$—O—)$_m$ comprises at least 85 mol %, preferably at least 90 mol %, based on the total molar amount of the block, of the unit (—$CH_2$—$CH_2$—O—). In particular, the polyethylenoxy block —(—$CH_2$—$CH_2$—O—)$_m$ consists of 85 to 95 mol % of the unit (—$CH_2$—$CH_2$—O—) and 5 to 15 mol % of the unit —(—$CH_2$—$CH(R^3)$—O—).

The invention preferably relates to a copolymer in which the radicals in monomer (a) of the formula (I) have the following meanings:

k: is from 15 to 35, preferably from 20 to 28, in particular from 23 to 26;
l: is from 5 to 25, preferably from 5 to 23, in particular from 5 to 20;
m: is from 1 to 15, preferably from 0.5 to 10;
$R^1$: is H;
$R^2$: is a divalent, linking group —O—($C_{n'}H_{2n'}$)—, where n' is 4;
the radicals $R^3$: are each, independently of one another, a hydrocarbon radical having 2 carbon atoms; in particular ethyl;
$R^4$: is H.

The invention further preferably relates to a copolymer in which the radicals in monomer (a) of the formula (I) have the following meanings:

k: is from 15 to 35, preferably from 20 to 28, particularly preferably from 23 to 26;

l: is from 7.5 to 25, preferably from 10 to 25, particularly preferably from 12.75 to 25; especially preferably from 13 to 23; for example, 14, 16 or 22;
m: is from 1 to 15, preferably from 0.5 to 10;
$R^1$: is H;
$R^2$: is a divalent, linking group —O—$(C_{n'}H_{2n'})$—, where n' is 4;
the radicals $R^3$: are each, independently of one another, a hydrocarbon radical having 2 carbon atoms; in particular ethyl;
$R^4$: is H.

The invention further preferably relates to a copolymer in which the radicals in monomer (a) of the formula (I) have the following meanings:
k: is from 15 to 35, preferably from 20 to 28, particularly preferably from 23 to 26;
l: is from 7.5 to 25, preferably from 10 to 25, particularly preferably from 12.75 to 25; especially preferably from 13 to 23; for example, 14, 16 or 22;
m: is from 0.1 to 10, preferably from 0.5 to 10; especially preferably from 2 to 5;
$R^1$: is H;
$R^2$: is a divalent, linking group —O—$(C_{n'}H_{2n'})$—, where n' is 4;
the radicals $R^3$: are each, independently of one another, a hydrocarbon radical having 2 carbon atoms; in particular ethyl;
$R^4$: is H.

The invention particularly preferably relates to a copolymer in which the radicals in monomer (a) of the formula (I) have the following meanings:
k: is from 23 to 26;
l: is from 12.75 to 17.25;
m: is from 1 to 15; preferably from 0.5 to 10;
$R^1$: is H;
$R^2$: is a divalent, linking group —O—$(C_{n'}H_{2n'})$—, where n' is 4;
the radicals $R^3$: are each, independently of one another, a hydrocarbon radical having 2 carbon atoms; in particular ethyl;
$R^4$: is H.

Furthermore, the invention relates, in particular, to a copolymer in which the radicals in monomer (a) of the formula (I) have the following meanings:
k: is from 23 to 26;
l: is from 8.5 to 11.5;
m: is from 1 to 15, preferably from 0.5 to 10;
$R^1$: is H;
$R^2$: is a divalent, linking group —O—$(C_{n'}H_{2n'})$—, where n' is 4;
$R^3$: is a hydrocarbon radical having 3 carbon atoms, in particular n-propyl;
$R^4$: is H.

In a particularly preferred embodiment, the invention relates to copolymers whose radicals in monomer (a) of the formula (I) have the following meanings:
k: is from 23 to 26;
l: is from 12.75 to 17.25;
m: is from 2 to 5;
$R^1$: is H;
$R^2$: is a divalent, linking group —O—$(C_{n'}H_{2n'})$—, where n' is 4;
$R^3$: is a hydrocarbon radical having 2 carbon atoms;
$R^4$: is H.

The invention also preferably relates to compositions which comprise a copolymer in which a monomer (d) of the formula (III)

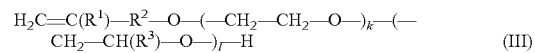

where the radicals $R^1$, $R^2$, $R^3$, k and l are as defined above, is present in addition to the monomer (a) of the formula (I).

The invention also preferably relates to a copolymer in which the weight ratio of the monomer (a) of the formula (I) to the monomer (d) of the formula (III) is in the range from 19:1 to 1:19, preferably in the range from 9:1 to 1:9.

The present patent application further provides a process for producing a composition according to the invention, wherein the monomer (a) of the general formula (I) is prepared by a process comprising the following steps:
a) reaction of a monoethylenically unsaturated alcohol A1 of the general formula (II)

with ethylene oxide,
where the radicals $R^1$ and $R^2$ are as defined above;
with addition of an alkaline catalyst K1 comprising KOMe and/or NaOMe; giving an alkoxylated alcohol A2;
b) reaction of the alkoxylated alcohol A2 with at least one alkylene oxide Z of the formula (Z)

where $R^3$ is as defined above;
with addition of an alkaline catalyst K2;
where the concentration of potassium ions in the reaction in step b) is less than or equal to 0.9 mol %, based on the alcohol A2 used;
and the reaction in step b) is carried out at a temperature of less than or equal to 135° C.,
giving an alkoxylated alcohol A3 of the formula (III),

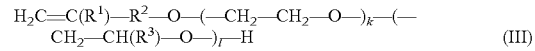

where the radicals $R^1$, $R^2$, $R^3$, k and l are as defined above;
c) reaction of the alcohol A3 with ethylene oxide; giving an alkoxylated alcohol A4 which corresponds to the monomer (a) of the formula (I) where $R^4$=H and m=1 to 15;
d) optionally etherification of the alkoxylated alcohol A4 with a compound

where $R^4$ is a hydrocarbon radical having 1 to 4 carbon atoms and X is a leaving group, preferably selected from the group consisting of Cl, Br, I, —O—$SO_2$—$CH_3$ (mesylate), —O—$SO_2$—$CF_3$ (triflate) and —O—$SO_2$—$OR^4$;
giving a monomer (a) of the formula (I) where $R^4$=hydrocarbon radical having 1 to 4 carbon atoms.

Step a) of the process of the invention comprises reacting a monoethylenically unsaturated alcohol A1 with ethylene oxide with addition of an alkaline catalyst K1 comprising KOMe (potassium methoxide) and/or NaOMe (sodium methoxide), giving an alkoxylated alcohol A2.

The preferred conditions (e.g., pressure and/or temperature ranges) identified below for the reactions of steps a), b), c) and optionally d) mean that the step in question is carried out wholly or partly under the conditions specified.

Step a) preferably first comprises reacting the monoethylenically unsaturated alcohol A1 with the alkaline catalyst K1. Typically, for this purpose, the alcohol A1 used as starting material is admixed, in a pressure reactor, with an alkaline catalyst K1. By means of reduced pressure of typically less than 100 mbar, preferably in the range from 50 to 100 mbar, and/or by an increase in the temperature, typically to 30 to 150° C., it is possible to strip off low boilers and/or water still present in the mixture. The alcohol thereafter is present substantially as the corresponding alkoxide. Typically the reaction mixture is treated subsequently with inert gas (e.g., nitrogen).

With further preference, step a) first comprises reacting the monoethylenically unsaturated alcohol A1 with the alkaline catalyst K1. Typically, for this purpose, the alcohol A1 used as starting material is admixed, in a pressure reactor, with an alkaline catalyst K1. By means of reduced pressure of typically less than 100 mbar, preferably in the range from 30 to 100 mbar, and/or by an increase in the temperature, typically to 30 to 150° C., it is possible to strip off low boilers and/or water still present in the mixture. The alcohol thereafter is present substantially as the corresponding alkoxide. Typically the reaction mixture is treated subsequently with inert gas (e.g., nitrogen).

Step a) preferably comprises adding ethylene oxide to the above-described mixture of alcohol A1 with the alkaline catalyst K1 (as described above). After the end of the addition of ethylene oxide, the reaction mixture can typically be afterreacted. The addition and/or afterreaction takes place typically over a period of 2 to 36 h, preferably of 5 to 24 h, especially preferably of 5 to 15 h, particularly preferably of 5 to 10 h.

With further preference, step a) comprises adding ethylene oxide to the above-described mixture of alcohol A1 with the alkaline catalyst K1 (as described above). After the end of the addition of ethylene oxide, the reaction mixture can typically be afterreacted. The afterreaction takes place typically over a period of 0.1 to 1 h. The addition, including optional letdown (interim reduction in the pressure from for example 6 to 3 bar absolute) and including afterreaction, takes place, for example, over a period of 2 to 36 h, preferably of 5 to 24 h, especially preferably of 5 to 15 h, particularly preferably of 5 to 10 h.

Step a) takes place typically at temperatures of 60 to 180° C., preferably of 130 to 150° C., more preferably of 140 to 150° C. More particularly, step a) comprises the addition of the ethylene oxide to the mixture of alcohol A1 with the alkaline catalyst K1 at a temperature of 60 to 180° C., preferably of 130 to 150° C., more preferably of 140 to 150° C.

The addition of the ethylene oxide to the mixture of alcohol A1 and alkaline catalyst K1 takes place preferably at a pressure in the range of 1 to 7 bar, preferably in the range from 1 to 5 bar. In order to conform to the safety provisions, the addition in step a) is made typically at a pressure in the range from 1 to 3.1 bar. More particularly, the addition of ethylene oxide and/or the afterreaction are carried out under the conditions stated above.

With further preference, the addition of the ethylene oxide to the mixture of alcohol A1 and alkaline catalyst K1 takes place at a pressure in the range of 1 to 7 bar, preferably in the range from 1 to 6 bar. In order to conform to the safety provisions, the addition in step a) is made typically at a pressure in the range from 1 to 4 bar, preferably 1 to 3.9 bar, more preferably from 1 to 3.1 bar or, in a further embodiment of the invention, from 3 to 6 bar. More particularly, the addition of ethylene oxide and/or the afterreaction are carried out under the conditions stated above.

Step a) preferably comprises adding the ethylene oxide to a mixture of alcohol A1 and alkaline catalyst K1 over a period of less than or equal to 36 h, preferably less or equal to 32 h, more preferably over a period of 2 to 32 h, and at a pressure of less than or equal to 5 bar, preferably 1 to 4 bar, especially preferably at 1 to 3.9 bar, and more particularly at 1 to 3.1 bar. In particular, the period indicated above encompasses the addition of ethylene oxide and/or the afterreaction.

In particular, the reaction of a monoethylenically unsaturated alcohol A1 with ethylene oxide, with addition of an alkaline catalyst K1 comprising KOMe (potassium methoxide) and/or NaOMe (sodium methoxide) as per step a) of the process of the invention may take place in one or more ethoxylation steps. A preferred process is one as described above where step a) comprises the following steps:

reaction of the monoethylenically unsaturated alcohol A1 with the alkaline catalyst K1, reaction of the mixture of alcohol A1 and catalyst K1 with a portion of the ethylene oxide, more particularly 10 to 50 wt %, more particularly 10 to 30 wt %, of the total amount of ethylene oxide, an intermediate step comprising a rest phase and/or a pressure letdown, and the reaction with the remaining portion of the ethylene oxide.

Further preferred is a process as described above where step a) comprises the following steps:

reaction of the monoethylenically unsaturated alcohol A1 with the alkaline catalyst K1, reaction of the mixture of alcohol A1 and catalyst K1 with a portion of the ethylene oxide, more particularly 50 to 98 wt %, more particularly 80 to 98 wt %, of the total amount of ethylene oxide, a step for removal of low boilers with letdown of pressure to a pressure of less than 100 mbar, preferably 50 to 100 mbar and/or increase in the temperature typically in the range from 30 to 150° C., reaction of the resulting ethoxylation product with the alkaline catalyst K1 and reaction of the remaining portion of the ethylene oxide with the mixture of ethoxylation product and alkaline catalyst K1.

Further preferred is a process as described above where step a) comprises the following steps:

reaction of the monoethylenically unsaturated alcohol A1 with the alkaline catalyst K1, reaction of the mixture of alcohol A1 and catalyst K1 with a portion of the ethylene oxide, more particularly 50 to 98 wt %, more particularly 80 to 98 wt %, of the total amount of ethylene oxide, a step for removal of low boilers with letdown of pressure to a pressure of less than 100 mbar, preferably 30 to 100 mbar and/or increase in the temperature typically in the range from 30 to 150° C., reaction of the resulting ethoxylation product with the alkaline catalyst K1 and reaction of the remaining portion of the ethylene oxide with the mixture of ethoxylation product and alkaline catalyst K1.

The alkaline catalyst K1 comprises in particular 10 to 100 wt % of KOMe and/or NaOMe, preferably 20 to 90 wt %. Besides KOMe and/or NaOMe, the catalyst K1 may comprise further alkaline compounds and/or a solvent (more particularly a C1-C6 alcohol). For example, a compound may be included that is selected from alkaline metal hydroxides, alkaline earth metal hydroxides, alkaline metal alkanolates (C2 to C6 potassium alkanolates, C2 to C6 sodium alkanolates, preferably ethanolate), alkaline earth metal alkanolates (more particularly C1 to C6 alkanolates, preferably methanolate and/or ethanolate). The catalyst K1 preferably, in addition to KOMe and/or NaOMe, comprises at least one further alkaline compound selected from sodium hydroxide and potassium hydroxide. In another preferred embodiment, the alkaline catalyst K1 consists of KOMe or of a mixture of KOMe and methanol (MeOH). Typically it is possible to employ a solution of 20 to 50 wt % KOMe in methanol (MeOH).

In a further preferred embodiment, the alkaline catalyst K1 consists of NaOMe or of a mixture of NaOMe and methanol (MeOH). Typically it is possible to employ a solution of 20 to 50 wt % NaOMe in methanol (MeOH).

In another preferred embodiment, the alkaline catalyst K1 consists of a mixture of KOMe and NaOMe or of a solution of KOMe and NaOMe in methanol.

Where KOMe is used as basic catalyst K1 for the reaction in step a), it is advantageous to use K1 in an amount such that an upper limit of 2500 ppm (about 0.4 mol %) of KOMe in relation to the alcohol A1 employed is observed, in order to prevent decomposition of the monoethylenically unsaturated alcohol A1. The concentration of potassium ions in step a) is preferably less than or equal to 0.4 mol %, based on the total amount of the alcohol A1 used, more preferably 0.1 to 0.4 mol %.

If KOMe is added in an amount such that the concentration is more than 0.9 mol %, based on the ethoxylated alcohol A2 (product of process step a)), then KOMe must be wholly or partly removed before step b), in order to give a potassium ion concentration of less than 0.9 mol % in process step b). This may be done, for example, by isolating the ethoxylated alcohol A2 after step a) and optionally purifying it.

In a further preferred embodiment, KOMe is used in an amount such that the concentration of potassium ions after the reaction in step a) is already less than or equal to 0.9 mol %, based on A2.

Step b) of the process of the invention comprises reacting the ethoxylated alcohol A2 with at least one alkylene oxide Z with addition of an alkaline catalyst K2, to get an alkoxylated alcohol A3 which corresponds to the monomer (a) of the formula (III)

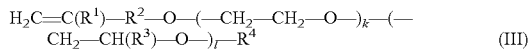

(III)

where $R^4$=H.

Step b) preferably comprises first reacting the ethoxylated alcohol A2 with the alkaline catalyst K2. Typically for this purpose the alcohol A2 is admixed, in a pressure reactor, with the alkaline catalyst K2. Through a reduced pressure of typically less than 100 mbar, preferably in the range from 50 to 100 mbar and/or through increase in the temperature, typically in the range from 30 to 150° C., it is possible for low boilers and/or water still present in the mixture to be stripped off. The alcohol thereafter is present substantially as corresponding alkoxide. The reaction mixture is then typically treated with inert gas (e.g. nitrogen).

With further preference, step b) comprises first reacting the ethoxylated alcohol A2 with the alkaline catalyst K2. Typically for this purpose the alcohol A2 is admixed, in a pressure reactor, with the alkaline catalyst K2. Through a reduced pressure of typically less than 100 mbar, preferably in the range from 30 to 100 mbar and/or through increase in the temperature, typically in the range from 30 to 150° C., it is possible for low boilers and/or water still present in the mixture to be stripped off. The alcohol thereafter is present substantially as corresponding alkoxide. The reaction mixture is then typically treated with inert gas (e.g. nitrogen).

Step b) preferably comprises adding the at least one alkylene oxide Z to the above-described mixture of alcohol A2 with the alkaline catalyst K2. After the end of the addition of the alkylene oxide Z, the reaction mixture is typically afterreacted. The addition and/or afterreaction takes place typically over a period of 2 to 36 h, preferably of 5 to 24 h, especially preferably of 5 to 20 h, particularly preferably of 5 to 15 h.

Step b) preferably comprises adding the at least one alkylene oxide Z to the above-described mixture of alcohol A2 with the alkaline catalyst K2. After the end of the addition of the alkylene oxide Z, the reaction mixture is typically afterreacted. The addition, including optional letdown and including afterreaction, takes place typically over a period of 2 to 36 h, preferably of 5 to 30 h, especially preferably of 10 to 28 h, particularly preferably of 11 to 24 h.

In accordance with the invention the concentration of potassium ions during the reaction in step b) is less than or equal to 0.9 mol %, preferably less than 0.9 mol %, preferably from 0.01 to 0.9 mol %, more preferably from 0.1 to 0.6 mol % based on the alcohol A2 used. In the case of the preparation of monomer (a), the concentration of potassium ions during the reaction in step b) is preferably 0.01 to 0.5 mol %, based on the alcohol A2 used.

In one particular preferred embodiment the concentration of potassium ions during reaction in step b) is 0.1 to 0.5 mol %, and the reaction in step b) is carried out at temperatures of 120 to 130° C.

The alkaline catalyst K2 preferably comprises at least one alkaline compound selected from alkaline metal hydroxides, alkaline earth metal hydroxides, alkaline earth metal alkanolates (more particularly C1 to C6 alkanolates, preferably methanolate and/or ethanolate). The catalyst preferably comprises at least one basic sodium compound, more particularly selected from NaOH, NaOMe, and NaOEt, more preferably NaOMe or NaOH. As catalyst K2 it is possible to use a mixture of the stated alkaline compounds; the catalyst K2 preferably consists of one of the stated basic compounds or mixtures of the stated alkaline compounds. Frequently an aqueous solution of the alkaline compounds is used. In another preferred embodiment, the alkaline catalyst K2 consists of NaOMe or of a mixture of NaOMe and methanol. Typically it is possible to use a solution of 20 to 50 wt % NaOMe in methanol. The catalyst K2 preferably contains no KOMe.

Preference in the case of the preparation in step b) is given to using a catalyst K2 comprising at least one basic sodium compound, more particularly selected from NaOH, NaOMe and NaOEt, with the concentration of sodium ions during the reaction in step b) being 3.5 to 12 mol %, preferably 3.5 to 7 mol %, more preferably 4 to 5.5 mol %, based on the alcohol A2 used.

In accordance with the invention the reaction in step b) is carried out at a temperature of less than or equal to 135° C. Preferably the reaction in step b) is carried out at temperatures of 60 to 135° C., preferably at 100 to 135° C., more preferably at 120 to 130° C. In particular, step b) comprises adding the at least one alkylene oxide Z to a mixture of alcohol A2 with alkaline catalyst K2 at a temperature of less than or equal to 135° C., preferably at temperatures of 60 to 135° C., more preferably at 100 to 135° C., more preferably at 120 to 135° C.

Step b) is preferably carried out at a pressure in the range from 1 to 3.1 bar, preferably from 1 to 2.1 bar. In order to meet the safety conditions, the reaction in step b) is carried out preferably at a pressure in the range of less than or equal to 3.1 bar (preferably 1 to 3.1 bar) if $R^3$ is a hydrocarbon radical having 2 carbon atoms, or at a pressure of less than or equal to 2.1 bar, preferably 1 to 2.1 bar, if $R^3$ is a hydrocarbon radical having more than 2 carbon atoms.

With further preference, step b) is carried out at a pressure in the range from 1 to 6 bar, preferably from 1 to 3.1 bar, especially preferably from 1 to 2.1 bar. The reaction in step b) is carried out preferably at a pressure in the range from 1 to 6 bar, preferably from 1 to 3.1 bar, preferably from 4 to 6 bar, if $R^3$ is a hydrocarbon radical having two carbon atoms. In particular, the addition of alkylene oxide Z and/or the afterreaction are carried out at the pressures stated above.

The present invention relates in particular to a copolymer where $R^3$ is a hydrocarbon radical having 2 carbon atoms and in the preparation of monomer (a) step b) is carried out at a pressure in the range from 1 to 3.1 bar; or where $R^3$ is a hydrocarbon radical having at least 3 carbon atoms, preferably having 3 carbon atoms, and in the preparation of monomer (a) step b) is carried out at a pressure of 1 to 2.1 bar.

In particular, the addition of alkylene oxide Z and/or the afterreaction are carried out at the pressure stated above. Preferably step b) comprises adding the at least one alkylene oxide Z to a mixture of alcohol A2 and alkaline catalyst K2 at a pressure in the range of less than or equal to 3.1 bar (preferably 1 to 3.1 bar) if $R^3$ is a hydrocarbon radical having 2 carbon atoms, or at a pressure of less than or equal to 2.1 bar, preferably 1 to 2.1 bar, if $R^3$ is a hydrocarbon radical having at least 3 carbon atoms.

Step b) preferably comprises adding the at least one alkylene oxide Z to a mixture of alcohol A2 with alkaline catalyst K2 over a period or less than or equal to 36 h, preferably less than or equal to 32 h, more preferably over a period of 2 to 32 h, very preferably over a period of 5 to 24 h, and at a pressure of less than or equal to 3.1 bar, preferably at 1 to 2.1 bar, more preferably at the pressures stated above.

With further preference, step b) comprises adding the at least one alkylene oxide Z to a mixture of alcohol A2 with alkaline catalyst K2 over a period or less than or equal to 36 h, preferably less than or equal to 32 h, more preferably over a period of 2 to 32 h, very preferably over a period of 11 to 24 h, and at a pressure of less than or equal to 3.1 bar, more preferably at the pressures stated above.

With particular preference, step b) is carried out at a pressure in the range from 1 to 3.1 bar, preferably at the pressures stated above and at a temperature of 120 to 130° C.

The process of the invention further comprises the step c) in which the alkoxylated alcohol A3 is reacted with ethylene oxide, giving an alkoxylated alcohol A4 which corresponds to the monomer (a) according to formula (I) with $R^4$=H and m=1 to 15, preferably 1 to 10, more preferably 0.1 to 10, more particularly 0.1 to 5, especially preferably 0.5 to 5 and very preferably 0.5 to 2.5.

Step c) takes place in particular without further addition of an alkaline catalyst. Step c) is carried out in particular at a pressure in the range from 1 to 7 bar, preferably from 1 to 5 bar, and at a temperature in the range from 60 to 140° C., preferably from 120 to 140° C., more preferably from 125 to 135° C. The ethoxylation in step c) takes place in particular over a period of 0.5 to 7 h, more particular of 0.5 to 5 h, preferably of 0.5 to 4 h.

Step c) takes place with further preference without further addition of an alkaline catalyst. Step c) is carried out in particular at a pressure in the range from 1 to 7 bar, preferably from 1 to 6 bar, and at a temperature in the range from 60 to 140° C., preferably from 120 to 140° C., more preferably from 120 to 135° C. The ethoxylation in step c) takes place in particular over a period of 0.5 to 7 h, more particularly of 1 to 5 h, preferably of 1 to 4 h.

Step c) preferably comprises adding ethylene oxide to the reaction mixture of step b), comprising the alkoxylated alcohol A3 according to formula (III) without further workup and/or pressure letdown. After the end of the addition of the ethylene oxide, the reaction mixture can typically be afterreacted. The addition and/or afterreaction takes place typically over a period of 0.5 to 10 h, more particularly 0.5 to 7 h, more particularly 0.5 to 5 h, preferably of 0.5 to 4 h.

With further preference, step c) comprises adding ethylene oxide to the reaction mixture of step b) comprising the alkoxylated alcohol A3 according to formula (III) without further workup and/or pressure letdown. After the end of the addition of the ethylene oxide, the reaction mixture can typically be afterreacted. The addition, including optional letdown and also including afterreaction, takes place typically over a period of 0.5 to 10 h, more particularly 2 to 10 h, more particularly 4 to 8 h.

The process of the invention may optionally comprise the step d), in which the alkoxylated alcohol A4 is etherified with a compound $R^4$—X, where X is a leaving group, preferably selected from Cl, Br, I, —O—SO$_2$—CH$_3$ (mesylate), —O—SO$_2$—CF$_3$ (triflate) or —O—SO$_2$—CR$^4$.

Where the alkoxylated alcohol A4 of the formula (I) is to be etherified with a terminal —OH— group (e.g., $R^4$=H), this may also take place with customary alkylating agents known in principle to a person skilled in the art, examples being alkyl sulfates and/or alkyl halides. Typically the compound $R^4$—X may comprise alkyl halides. For the etherification it is also possible, in particular, to use dimethyl sulfate or diethyl sulfate. The etherification is only an option, which may be selected by a person skilled in the art in accordance with the properties desired for the copolymer.

Beyond the monomers (a), the copolymer of the invention comprises at least one monoethylenically unsaturated, hydrophilic monomer (b), which is different from monomers (a). It will be appreciated that mixtures of two or more different hydrophilic monomers (b) may also be used.

Besides an ethylenic group, the hydrophilic monomers (b) comprise one or more hydrophilic groups. These groups give the copolymer of the invention sufficient solubility in water, by virtue of their hydrophilicity. The hydrophilic groups are more particularly functional groups which comprise O and/or N atoms. They may additionally include, as heteroatoms, especially S and/or P atoms.

With particular preference, the monomers (b) are miscible with water in any proportion, though for the performance of the invention it is sufficient for the hydrophobically associating copolymer of the invention to possess the solubility in water as mentioned at the outset. The solubility of the monomers (b) in water at room temperature should preferably be at least 100 g/l, more particularly at least 200 g/l, and more preferably at least 500 g/l.

Examples of suitable functional groups comprise carbonyl groups >C=O, ether groups —O—, more particularly polyethylenoxy groups —(CH$_2$—CH$_2$—O—)$_n$—, where n is preferably from 1 to 200, hydroxyl groups —OH, ester groups —C(O)O—, primary, secondary or tertiary amino groups, ammonium groups, amide groups —C(O)—NH—, carboxamide groups —C(O)—NH$_2$ or acidic groups such as carboxyl groups —COOH, sulfonic acid groups —SO$_3$H, phosphonic acids groups —PO$_3$H$_2$ or phosphoric acid groups —OP(OH)$_3$.

Examples of preferred functional groups comprise hydroxyl groups —OH, carboxyl groups —COOH, sulfonic acid groups —SO$_3$H, carboxamide groups —C(O)—NH$_2$, amide groups —C(O)—NH— and also polyethylenoxy groups —(CH$_2$—CH$_2$—O—)$_n$—H, where n is preferably from 1 to 200.

The functional groups may be attached directly to the ethylenic group, or else may be joined to the ethylenic group via one or more linking hydrocarbon groups.

The hydrophilic monomers (b) are preferably monomers of the general formula H$_2$C=C(R$^5$)R$^6$ (IV), where R$^5$ is H or methyl and R$^6$ is a hydrophilic group or a group comprising one or more hydrophilic groups.

The groups R$^6$ are groups which comprise heteroatoms in an amount such that the water solubility defined at the outset is achieved.

For example, suitable monomers (b) comprise monomers comprising acidic groups, examples being monomers comprising —COOH groups such as acrylic acid or methacrylic acid, crotonic acid, itaconic acid, maleic acid or fumaric acid, monomers comprising sulfonic acid groups such as vinylsulfonic acid, allylsulfonic acid, sulfoethyl methacrylat, 2-carylamido-2-methylpropanesulfonic acid (AMPS), 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups such as vinylphosponic acid, allylphosphonic acid, N-(meth)acrylamidoalkylphosphonic acids or (meth)acryloyloxyalkylphosphonic acids.

Mention should also be made of acrylamide and methacrylamide and also derivatives thereof, such as, for example, N-methyl(meth)acrylamide, N,N'-dimethyl(meth)acrylamide and also N-methylolacrylamide, N-vinyl derivates such as N-vinylformamide, N-vinylacetamide, N-vinylpyrrolidone or N-vinylcaprolactam and also vinyl esters, such as vinyl formate or vinyl acetate. N-vinyl derivates can be hydrolyzed after polymerization to vinyl amine units, vinyl esters to vinyl alcohol units.

Further examples comprise monomers comprising hydroxyl and/or ether groups, such as, for example, hydroxyethyl (meth)acrylate, hydroxypropyl (meth)acrylate, allyl alcohol, hydroxyvinyl ethyl ether, hydroxyvinyl propyl ether, hydroxyvinyl butyl ether or compounds of the formula H$_2$C=C(R$^1$)—O—(—CH$_2$—CH(R$^7$)—O—)$_b$—R$^8$ (V) where R$^1$ is as defined above and b is from 2 to 200, preferably 2 to 100. The radicals R$^7$ are independently of one another H, methyl or ethyl, preferably H or methyl, with the proviso that at least 50 mol % of the radicals R$^7$ are H. Preferably at least 75 mol % of the radicals R$^7$ are H, more preferably at least 90 mol % of the radicals R$^7$ are H and very preferably all of the radicals R$^7$ are H. The radical R$^8$ is H, methyl or ethyl, preferably H or methyl. The individual alkylenoxy units may be arranged randomly or in blocks. In the case of a block copolymer, the transition between the blocks may be abrupt or gradual.

Other suitable hydrophilic monomers (b) are described in WO 2011/133527 (page 15, lines 1-23).

The above-stated hydrophilic monomers may of course be used not only in the represented acid form or base form, but also in the form of corresponding salts. It is also possible for acidic or basic groups to be converted into corresponding salts after the polymer has been formed. The corresponding salts are preferably alkaline metal salts or ammonium salts, more preferably organic ammonium salts, especially preferably water-soluble organic ammonium salts.

Preference is given to a copolymer wherein at least one of the monomers (b) is a monomer comprising acidic groups, the acidic groups comprising at least one group selected from the group of —COOH, —SO$_3$H and —PO$_3$H, and salts thereof.

Preferably at least one of the monomers (b) is a monomer selected from a group of (meth)acrylic acid, vinylsulfonic acid, allylsulfonic acid, sulfoethyl methacrylate and 2-acrylamido-2-methylpropanesulfonic acid (AMPS), more preferably acrylic acid and/or AMPS and/or salts thereof.

The invention relates preferably to a copolymer which comprises at least two different monoethylenically unsaturated, hydrophilic monomers (b), these being
at least one neutral hydrophilic monomer (b1), and
at least one hydrophilic anionic monomer (b2), which comprises at least one acidic group selected from the group of —COOH, —SO$_3$H and —PO$_3$H$_2$, and salts thereof.

Examples for suitable monomers (b1) comprise acrylamide and methacrylamide, preferably acrylamide and also derivatives thereof, such as, for example, N-methyl(meth)acrylamide, N,N'-dimethyl(meth)acrylamide and also N-methylolacrylamide. Mention should additionally be made of N-vinyl derivates such as N-vinylformamide, N-vinylacetamide, N-vinylpyrrolidone or N-vinylcaprolactam. Also to be stated are monomers containing OH groups such as hydroxylethyl (meth)acrylate, hyddroxypropyl (meth)acrylate, allyl alcohol, hydroxyvinyl ether ether, hydroxyvinyl propyl ether or hydroxyvinyl butyl ether. The monomer (b1) in the copolymer of the invention is preferably acrylamide and/or derivatives thereof, more preferably acrylamide.

Examples of anionic monomers (b2) comprise acrylic acid or methacrylic acid, crotonic acid, itaconic acid, malaic acid or fumaric acid, monomers comprising sulfonic acid groups such as vinylsulfonic acid, allylsulfonic acid, 2-acrylamido-2-methylpropanesulfonic acid (AMPS), 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups such as vinylphosponic acid, allylphosphonic acid, N-(meth)acrylamidoalkylphosphonic acids or (meth)acryloyloxyalkylphosphonic acids.

Examples of preferred anionic monomers (b2) comprise acrylic acid, vinylsulfonic acid, allylsulfonic acid, 2-acrylamido-2-methylpropanesulfonic acid (AMPS), 2-acrylamidobutanefulsonic acid, 3-acrylamido-3-methylbutanesulfonic acid and 2-acrylamido-2,4,4-trimethylpentanesulfonic acid, very preferably 2-acrylamido-2-methylpropanesulfonic acid (AMPS).

The copolymers is preferably a copolymer which comprises acrylamide as monomer (b1) and a monomer comprising acidic groups as monomer (b2).

The copolymer is preferably a copolymer which as monomer (b1) comprises acrylamide and as monomer (b2) comprises a monomer comprising acidic groups, the acidic group being —SO$_3$H. With more particular preference the copolymer is one which as monomer (b1) comprises acrylamide and as monomer (b2) comprises 2-acrylamido-2-methylpropanesulfonic acid (AMPS).

With preference the copolymer is a copolymer which comprises acrylamide as monomer (b1) and acrylic acid as monomer (b2).

With further preference the copolymer is one which as monomer (b1) comprises acrylamide, and comprises at least two further, different monomers (b2) comprising acidic groups. Especially preferably it is a copolymer which comprises acrylamide as monomer (b1) and, as monomer (b2) comprising acidic groups, one monomer comprising the group —SO$_3$H and one monomer comprising the group —COOH.

With further preference the copolymer comprises as monomer (b1) acrylamide, as monomer (b2) 2-acrylamido-2-methylpropanesulfonic acid (AMPS) and a monomer comprising the group —COOH. With further preference the copolymer is one comprising as monomer (b1) acrylamide, and as monomer (b2) 2-acrylamido-2-methylpropanesulfonic acid (AMPS) and acrylic acid.

The amount of the monomers (b) in the copolymer of the invention is 25 to 99.9 wt % based on the total amount of all monomers in the copolymer, preferably 25 to 99.5 wt %. The precise amount is guided by the nature and the desired end use of the hydrophobically associating copolymers, and is specified accordingly by a person skilled in the art.

The at least one copolymer is preferably a copolymer based on at least one monomer (a) of the formula (I), and also acrylamide as neutral hydrophilic monomer (b1), and acrylamido-2-methylpropanesulfonic acid (AMPS) as anionic hydrophilic monomer (b2).

With more particular preference the at least one copolymer comprises 0.5 to 15 wt % of at least one hydrophobically associating monomer (a), and also
19.5 to 80 wt % of acrylamide as neutral hydrophilic monomer (b1), and
19.5 to 80 wt % of acrylamido-2-methylpropanesulfonic acid (AMPS) as anionic hydrophilic monomer (b2).

Very preferably the at least one copolymer comprises 1 to 7.5 wt % of at least one hydrophobically associating monomer (a), and also
45 to 55 wt % of acrylamide as neutral hydrophilic monomer (b1), and
44 to 54 wt % of acrylamido-2-methylpropanesulfonic acid (AMPS) as anionic hydrophilic monomer (b2).

In one preferred embodiment, component ((3) further comprises (c) at least one nonionic, nonpolymerizable, surface-active component. This may more particularly be at least one nonionic surfactant. However, anionic and cationic surfactants are suitable as well, provided they do not take part in the polymerization reaction.

Preferably (c) is at least one nonionic surfactant.

The surfactants in question may more particularly be surfactants, preferably nonionic surfactants, of the general formula $R^{10}$—Y', where $R^{10}$ is a hydrocarbon radical having 8 to 32, preferably 10 to 20 and more preferably 12 to 18, carbon atoms, and Y' is a hydrophilic group, preferably a nonionic hydrophilic group, more particularly a polyalkoxy group.

The nonionic surfactant is preferably an ethoxylated long-chain aliphatic alcohol having 10 to 20 carbon atoms, which may optionally include aromatic fractions.

By way of example, mention may be made of the following: $C_{12}C_{14}$ fatty alcohol ethoxylates, $C_{16}C_{18}$ fatty alcohol ethoxylates, $C_{13}$ oxo-process alcohol ethoxylates, $C_{10}$ oxo-process alcohol ethoxylates, $C_{13}C_{15}$ oxo-process alcohol ethoxylates, $C_{10}$ guerbet alcohol ethoxylates and alkylphenol ethoxylates. Particularly well-established are compounds with 5 to 20 ethylenoxy units, preferably 8 to 18 ethylenoxy units. Optionally it is also possible for small amounts of higher alkylenoxy units to be present, more particularly propylenoxy and/or butylenoxy units, although the amount of ethylenoxy units ought in general to be at least 80 mol % relative to all alkylenoxy units.

Especially suitable are surfactants selected from the group of the ethoxylated alkylphenols, of the ethoxylated, saturated iso-C13 alcohols and/or of the ethoxylated C10 guerbet alcohols, there being in each case 5 to 20 ethylenoxy units, preferably 8 to 18 ethylenoxy units, present in the alkoxy radicals.

The copolymers of the invention can be prepared in accordance with methods known in principle to a person skilled in the art by radical polymerization of the monomers (a) and (b), as for example by bulk, solution, gel, emulsion, dispersion or suspension polymerization, preferably in aqueous phase. The polymerization is carried out preferably in the presence of at least one surface-active component (c).

The present invention relates to a process for producing a copolymer of the invention as described above, which comprises subjecting at least one monomer (a) and at least one hydrophilic monomer (b) to an aqueous solution polymerization. The solution polymerization is carried out preferably in the presence of at least one surface-active component (c).

In relation to the process for producing the copolymer of the invention, the preferred embodiments are the same as those described above in connection with the copolymers of the invention.

One aspect of the present invention is a process for producing the copolymer of the invention wherein the solution polymerization is carried out at a pH of 5.0 to 9.

In accordance with the preparation process set out above, the monomers (a) of the formula (I) that are used in accordance with the invention are provided by multistage alkoxylation of alcohols (II), followed optionally by an etherification. In relation to the process for producing the monomer (a), the preferred embodiments are the same as those described above in connection with the copolymers of the invention.

In one preferred embodiment, the copolymer is prepared by means of gel polymerization in aqueous phase, provided that all of the monomers employed have a sufficient solubility in water. In the sense of the present invention, a gel polymerization is a special case of solution polymerization, and is therefore encompassed by the latter term. For the gel polymerization, first of all a mixture of the monomers, initiators and other auxiliaries with water or with an aqueous solvent mixture is provided. Suitable aqueous solvent mixtures comprise water and also water-miscible organic solvents, the fraction of water being generally at least 50 wt %, preferably at least 80 wt % and more preferably at least 90 wt %. Organic solvents herein include, in particular, water-miscible alcohols such as methanol, ethanol or propanol. Acidic monomers may be neutralized wholly or partly prior to the polymerization.

The concentration of all of the components bar the solvents is customarily 25 to 60 wt %, preferably 30 to 50 wt %.

The mixture is subsequently polymerized photochemically and/or thermally, preferably at −5° C. to 50° C. If polymerization takes place thermally, it is preferred for polymerization initiators to be used which set in even at comparatively low temperature, such as redox initiators, for example. The thermal polymerization may be performed even at room temperature or by heating of the mixture, preferably to temperatures of not more than 50° C. The photochemical polymerization is performed customarily at temperatures of −5 to 10° C. With particular advantage, photochemical and thermal polymerization can be combined with one another, by adding not only initiators for the thermal polymerization but also initiators for the photochemical polymerization to the mixture. The polymerization in this case is first initiated photochemically at low temperatures, preferably −5 to +10° C. As a result of the heat of reaction that is liberated, the mixture warms up, as a result of which the thermal polymerization additionally is initiated. Using this combination it is possible to achieve a conversion of more than 99%.

The gel polymerization takes place as a general rule without stirring. It may take place batch wise, with the mixture being irradiated and/or heated in a suitable vessel, with a layer thickness of 2 to 20 cm. The polymerization forms a solid gel. The polymerization may also take place continuously. For this purpose a polymerization apparatus is utilized that possesses a conveyer belt for accommodating the mixture to be polymerized. The conveyer belt is fitted with devices for heating or for irradiation with UV radiation. Thereafter the mixture is poured by means of a suitable apparatus on one end of the belt, and in the course of transport in the belt direction, the mixture undergoes polymerization, and the solid gel can be taken off at the other end of the belt.

Following the polymerization, the gel is comminuted and dried. Drying ought to take place preferably at temperatures below 100° C. In order to avoid sticking, a suitable release agent can be used for this step. The copolymer of the invention is obtained as a powder.

Further details of the conduct of a gel polymerization are disclosed in DE 10 2004 032 304 A1, paragraphs [0037] to [0041], for example.

Copolymers of the invention in the form of alkaline-soluble aqueous dispersions can be prepared preferably by means of emulsion polymerization. The performance of an emulsion polymerization using hydrophobically associating monomers is disclosed in WO 2009/019225, page 5 line 16 to page 8 line 13, for example.

The copolymers of the invention possess preferably a molar mass average M of 2 000 000 to 30 000 000 g/mol, and also 3 000 000 to 25 000 000 g/mol, especially preferably 5 000 000 g/mol to 20 000 000 g/mol, and more particularly 6 000 000 g/mol to 16 000 000 g/mol.

In one preferred embodiment the inorganic binder of the invention may be at least one from the series of calcium sulfate n-hydrate, Portland cement, white cement, calcium aluminate cement, calcium sulfoaluminate cement, geopolymer and latent hydraulic and/or pozzolanic binder, such as, for example, fly ash, metakaolin, silica dust and slag sand. Particular preference is given to cement based on Portland cement, calcium sulfate hemihydrate, calcium sulfate anhydrite and calcium aluminate cement.

The composition of the invention may in particular comprise pulverulent mixtures which are subsequently made up with water.

In a further-preferred embodiment, the composition of the invention comprises an inorganic filler. The inorganic filler may preferably be at least one from the series of silica sand, finely ground quartz, limestone, heavy spar, calcite, dolomite, talc, kaolin, mica and chalk.

In one specific embodiment, the composition of the invention, based on its dry mass, consists to an extent of at least 80 wt %, more particularly at least 90 wt % and very preferably more than 95 wt % of an inorganic binder and an inorganic filler.

In one particularly preferred embodiment, the composition of the invention is a factory dry-mix mortar, more particularly masonry mortars, render mortars, mortars for thermal insulation composite systems, renovating renders, jointing mortars, tile adhesives, thin-bed mortars, screed mortars, casting mortars, injection mortars, filling compounds, grouts or lining mortars.

As a result of continual efforts towards substantial rationalization and also improved product quality, mortars for a very wide variety of uses in the construction sector are nowadays virtually no longer mixed together on the building site itself from the starting materials. This function is nowadays largely carried out at the factory in the construction materials industry, and the ready-to-use mixtures are supplied in the form of what are called factory dry-mix mortars. Completed mixtures which are made workable on site exclusively by addition of water and commixing are referred to according to DIN 18557 as factory mortars, more particularly as factory dry-mix mortars. Mortar systems of this kind may fulfill any of a very wide variety of physical construction objectives. Depending on the objective imposed, the binder may be admixed with further additives or admixtures in order to adapt the factory dry-mix mortar to the specific application. The additives and admixtures in question may include, for example, shrinkage reducers, expansion agents, accelerators, retardants, dispersants, defoamers, air entrainers and corrosion inhibitors.

In one particular embodiment the composition of the invention may also be a self-leveling underlayment composition.

The composition of the invention may therefore in particular be present in the form of a dry mortar. The present patent application here also encompasses a process for producing the composition of the invention, by contacting the at least one copolymer of the invention with the at least one inorganic binder and any further components, by mixing. More particularly the copolymer of the invention here is in the form of a powder.

For dry-mix mortar applications, the copolymers of the invention are employed preferably in powder form. In this case it is preferred for the size distribution of the particles to be selected such that the average particle diameter is less than 100 μm and the fraction of particles having a diameter of greater than 200 μm is less than 2 wt %. Preferred powders are those whose average particle diameter is less than 60 μm and the fraction of particles having a diameter of greater than 120 μm is less than 2 wt %. Particularly preferred powders are those whose average particle diameter is less than 50 μm and the fraction of particles having a diameter of greater than 100 μm is less than 2 wt %. The particle diameter of the copolymers of the invention in powder form may be brought to the preferred size distributions by means of grinding, for example.

The inorganic binder may, in one preferred embodiment, be calcium sulfate n-hydrate (n=0 to 2), also referred to hereinafter as gypsum. The expression "gypsum" is used synonymously in the present context with calcium sulfate, and the calcium sulfate may be present in its various anhydrous and hydrated forms with and without water of crystallization. Natural gypsum substantially comprises calcium sulfate dihydrate ("dihydrate"). The natural form of calcium sulfate, free from water of crystallization, is encompassed by the expression "anhydrite". As well as the naturally occurring forms, calcium sulfate is a typical byproduct of industrial operations, and is then referred to as "synthetic gypsum". One typical example of a synthetic gypsum from industrial operations is flue gas desulfurization. Synthetic gypsum, however, may equally be formed as the byproduct of phosphoric acid or hydrofluoric acid production processes. Typical gypsum ($CaSO_4 \times 2H_2O$) can be calcined, with the water of crystallization being removed. Products of the wide variety of different calcination processes are α- or β-hemihydrate. β-Hemihydrate results from rapid heating in open vessels, accompanied by rapid evaporation of water, forming voids. α-Hemihydrate is produced by the dewatering of gypsum in closed autoclaves. The crystal habit in this case is relatively impervious, and so this binder requires less water for liquefaction than does β-hemihydrate. On the other hand, hemihydrate undergoes rehydration with water to form dihydrate crystals. Gypsum hydration customarily takes from several minutes to hours, resulting in a shortened working time in comparison to cements, which require several hours to days for complete hydration. These qualities make gypsum a useful alternative to cements as binders in a wide variety of areas of application. Moreover, fully cured gypsum products exhibit pronounced hardness and compressive strength.

The form selected for a very wide variety of areas of application is β-hemihydrate, since it has better availability and exhibits numerous advantages from an economic standpoint. These advantages, however, are in part negated by the greater water demand of β-hemihydrate in use, in order for fluid suspensions to be obtained at all. Moreover, the dried gypsum products produced therefrom tend to have a certain weakness, which can be attributed to quantities of residual water which have remained in the crystal matrix on curing. For this reason, corresponding products exhibit less hardness than gypsum products prepared with smaller amounts of mixing water.

Calcium sulfate n-hydrate for the purposes of the present invention, therefore, is more preferably β-calcium sulfate hemihydrate. β-Calcium sulfate hemihydrate of the invention here is suitable more particularly for use in gypsum-based self-leveling screed.

The inorganic binder may with further preference be a geopolymer. Geopolymers are inorganic binder systems based on reactive, water-insoluble compounds, in turn based on $SiO_2$ in conjunction with $Al_2O_3$, which cure in an aqueous-alkaline medium. Specific geopolymer compositions are described in, for example, U.S. Pat. No. 4,349,386, WO 85/03699 and U.S. Pat. No. 4,472,199. As reactive oxide or oxide mixture it is possible in this context to make use, among others, of micro silica, metakaolin, aluminosilicates, fly ashes, activated clay, pozzolanes or mixtures thereof.

The alkaline medium for the activation of the binders consists customarily of aqueous solutions of alkali metal carbonates, alkali metal fluorides, alkali metal hydroxides, alkali metal aluminates and/or alkali metal silicates such as soluble waterglass, for example. By comparison with Portland cement, geopolymers can be more cost-effective and more resistant, particularly toward acids, and can have a more favorable balance of $CO_2$ emission.

The composition of the invention may in particular also comprise a binder mixture. In the present context this means mixtures of at least two binders from the series of cement, pozzolanic and/or latent hydraulic binder, white cement, specialty cement, calcium aluminate cement, calcium sulfoaluminate cement, geopolymer, and the various hydrous and anhydrous calcium sulfates.

In the context of the present invention, the composition of the invention may be present in a dry form, meaning that it has a Karl-Fischer water content of less than 5 wt %, preferably less than 1 wt % and more preferably of less than 0.1 wt %.

It is preferred for the composition of the invention to have an average particle size of between 0.1 and 1000 μm, more preferably between 1 and 200 μm. The particle size here is determined by means of laser diffractometry.

The present specification further provides for the use of the copolymer of component (β) as rheological additive in a composition of the invention, particularly for reducing segregation, sedimentation and bleeding of the composition.

The examples which follow are intended to elucidate the invention in more detail.

EXAMPLES

Preparation of Monomer M1:

A 1 l stirred stainless steel autoclave was charged with 44.1 g of hydroxylbutyl vinyl ether. Then 3.12 g of KOMe (32% strength in MeOH) were metered in and the methanol was stripped off at 80° C. and about 30 mbar. This was followed by heating to 140° C.; the reactor was flushed with nitrogen and an initial nitrogen pressure of 1.0 bar was set. Then 368 g of ethylene oxide (EO) were metered in over the course of about 3 h. After half an hour of subsequent reaction at 140° C., the reactor was cooled to 125° C. and a total of 392 g of pentene oxide (PeO) were metered in over the course of 3.5 h. The subsequent reaction ran over night.

A hydroxylbutyl vinyl ether alkoxylate with 22 EO units and 12 PeO units (monomer M1) is obtained. The product had an OH number of 31.9 mg KOH/g (theoretical: 26.5 mg KOH/g). The OH number was determined by means of the acetic anhydride (AAn) method.

Preparation of Monomer M2:

A 2 l pressure autoclave with anchor stirrer was charged with 135.3 g (1.16 mol) of hydroxybutyl vinyl ether (HBVE) (stabilized with 100 ppm of potassium hydroxide (KOH)) and the stirrer was engaged. 1.06 g of potassium methoxide (KOMe) solution (32% KOMe in methanol (MeOH), corresponding to 0.0048 mol of potassium) were run in, and the stirred vessel was evacuated to a pressure of less than 10 mbar, heated to 80° C., and operated for 70 min at 80° C. under a pressure of less than 10 mbar. MeOH was removed by distillation.

In an alternative procedure, the potassium methoxide (KOMe) solution (32% KOMe in methanol (MeOH)) was run in and the stirred vessel was evacuated to a pressure of 10-20 mbar, heated to 65° C., and operated for 70 min at 65° C. under a pressure of 10-20 mbar. MeOH was removed by distillation.

The vessel was flushed three times with $N_2$ (nitrogen). Thereafter it was tested for pressure-tightness, adjusted to 0.5 bar overpressure (1.5 bar absolute), and heated to 120° C. After letdown of the vessel to 1 bar absolute, 1126 g (25.6 mol) of ethylene oxide (EO) were metered until $p_{max}$ was 3.9 bar absolute and $T_{max}$ was 150° C. Following addition of 300 g of EO, the metering was discontinued (about 3 h after the start), and a 30-minute pause was followed by letdown to 1.3 bar absolute. Then the remainder of the EO was metered in. The EO metering lasted, including letdown, for a total of 10 h.

Stirring then took place to constant pressure at about 145-150° C. (1 h), after which the batch was cooled to 100° C. and was freed from low boilers under a pressure of less than 10 mbar for 1 h.

In this case, a hydroxybutyl vinyl ether akolylate with 22 EO units was obtained.

A 2 l pressure autoclave with anchor stirrer was charged with 588.6 g (0.543 mol) of hydroxybutyl vinyl ether alkoxylate with 22 EO units, and the stirrer was switched on. Thereafter 2.39 g of 50% strength NaOH solution (0.030 mol NaOH, 1.19 g NaOH) were added, reduced pressure of <10 mbar was applied, and the temperature was raised to 100° C. and maintained for 80 min in order to remove the water by distillation.

N₂ flushing was carried out three times. Thereafter the vessel was tested for pressure-tightness, 0.5 bar overpressure (1.5 bar absolute) was set, heating took place to 127° C., and after that the pressure was set to 1.6 bar absolute. 59.7 g (1.358 mol) of EO were metered in at 127° C.; $p_{max}$ was 3.9 bar absolute. After a 30-minute wait for constant pressure to become established, the vessel was let down to 1.0 bar absolute.

625.5 g (8.688 mol) of BuO (butylene oxide) were metered in at 127° C.; $p_{max}$ was 3.1 bar absolute. An interim letdown became necessary owing to the increase in fill level. The BuO feed was halted, reaction was allowed to take place for 1 h until pressure was constant, followed by letdown to 1.0 bar absolute. Thereafter the metered addition of BuO was continued. $P_{max}$ was still 3.1 bar (first letdown after 610 g BuO, total BuO metering 8 h including wait for letdown). After the end of the BuO feed, reaction was allowed to continue for 8 h, followed by heating to 135° C. Thereafter 83.6 g (1.901 mol) of EO were metered in at 135° C.; $p_{max}$ was 3.1 bar absolute. The end of the EO feed was followed by further reaction for 4 h. The batch was cooled to 100° C., residual oxide was stripped off until the pressure was below 10 mbar for at least 10 min. This was followed by the addition of 0.5% of water at 120° C. and by subsequent stripping until the pressure was below 10 mbar for at least 10 min. The reduced pressure was canceled out with N₂, and 100 ppm of butylated hydroxytoluene (BHT) were added. The product was discharged at 80° C. under N₂.

A hydroxybutyl vinyl ether alkoxylate with 24.5 EO units, 16 BuO units and 3.5 EO units (monomer M2) is obtained. Analysis (mass spectrum, GPC, ¹H NMR in CDCl₃, ¹H NMR in MeOD) confirmed the structure.

General Preparation Example for Copolymers A and B

In a 2 l three-neck flask with stirrer and thermometer, the following components were mixed with one another:
290 g distilled water,
242.5 g acrylamido-2-methylpropanesulfonic acid, Na salt (50 wt % strength solution in water;
24.7 mol %),
1.2 g silicone defoamer,
2.4 g pentasodium diethylenetriaminepentaacetate (complexing agent),
228.8 g acrylamide (50 wt % strength solution in water; 75.2 mol %),
4.6 g monomers M1 (comparative example, copolymer B) or monomer M2 (inventive, copolymer A)

The solution was adjusted to a pH of 6 using 20% strength aqueous sodium hydroxide solution, then rendered inert by flushing with nitrogen for 10 minutes and cooled to about 5° C. The solution was transferred to a plastic container, and then in succession 200 ppm of 2,2'-azobis (2-amidinopropane) dihydrochloride (as a 1 wt % strength solution), 10 ppm of tert-butyl hydroperoxide (as a 0.1 wt % strength solution), 5 ppm of FeSO₄.7H₂O (as a 1 wt % strength solution) and 6 ppm of sodium bisulfit (as 1 wt % strength solution) were added. The polymerization was initiated by exposure to UV light (two Philips tubes; Cleo Performance 40 W). After about 2 h, the hard gel was taken from the plastic container and cut using scissors into gel cubes measuring approximately 5 cm×5 cm×5 cm. Before the gel cubes were comminuted using a conventional mincer, they were coated with a commercial release agent. The release agent is a polydimethylsiloxane emulsion, and was diluted 1:20 with water. The resulting gel granules were spread uniformly on drying racks and dried to constant weight in a forced-air drying cabinet under reduced pressure at about 90 to 120° C.

Preparation of Copolymer C Based on Monomer M2 (Comparative Example)

A 2 l polymerization reactor with stirrer, reflux condenser, thermometer and inert gas connection was initially charged with 663.77 g of demineralized water. While stirring, 151.60 g (0.331 mol) of 2-acrylamido-2-methylpropanesulfonic acid, Na salt (50% solution in water), 1.0 g of Xiameter AFE-0400 (silicone defoamer), 142.68 g (1.00 mol) of acrylamide (50% solution in water) and 3.0 g of Trilon C (5% aqueous solution of the pentasodium salt of diethylenetriaminepentaacetic acid) were added. Subsequently, the pH was adjusted to 6.0 with a 5% NaOH solution and/or 5% H₂SO₄ solution. Thereafter, 2.85 g (0.0011 mol) of monomer M2 and 1.0 g of sodium hypophosphite (10% solution in water) as chain transfer agent were added. After the addition of 22.01 g of demineralized water, the pH was adjusted again to 6.0 with a 5% NaOH solution and/or 5% H₂SO₄ solution. The solution was inertized by purging with nitrogen for 10 minutes and heated to 60° C. This was followed by successive addition of 1.6 g of tetraethylenepentamine (20% by weight solution in water) and 10.0 g of sodium peroxodisulfate (20% by weight solution in water), in order to initiate the polymerization. After the temperature had peaked, 5.0 g of 2,2'-azobis(2-methylpropion-amidine) dihydrochloride (10% solution in water) were added and then the mixture was stirred at 65° C. for another 1 hour, in order to complete the polymerization.

Performance Tests

The self-leveling calcium sulfate screed was composed of 39.55 parts by weight of anhydrite and 60.0 parts by weight of standard sand (DIN EN 196-1). As initiator, 0.45 parts by weight of potassium sulfate was added. The amount of water used was 14.0 parts by weight, corresponding to a water-binder ratio of 0.35. To plasticize the self-leveling calcium sulfate screed, a polycarboxylate ether was added. The amount of the polycarboxylate ether, at 0.04 parts by weight was selected so that the self-leveling calcium sulfate screed, without the addition of a copolymer, 5 min after addition of water achieved a Hägermann cone slump flow of 280±5 mm.

The self-leveling calcium sulfate screeds were produced in accordance with DIN EN 196-1:2005 in a mortar mixer with a capacity of approximately 5 liters. For mixing up, water, plasticizer, copolymer (see table 1) and anhydrite were placed into the mixing vessel. Immediately thereafter the mixing operation was commenced, with the fluidizer at a low speed (140 revolutions per minute (rpm)). After 30 seconds, the standard sand was added at a uniform rate over the course of 30 seconds to the mixture. The mixer was then switched to a higher speed (285 rpm), and mixing was continued for 30 seconds more. After that the mixer was held on for 90 seconds. During the first 30 seconds, the self-leveling calcium sulfate screed, which stuck to the wall and to the lower part of the bowl, was removed with a rubber scraper and put into the middle of the bowl. After the wait, the self-leveling calcium sulfate screed was mixed for a further 60 seconds at the higher mixing speed. The total mixing time was 4 minutes.

In order to assess the effect of the copolymer on the flow properties of the self-leveling calcium sulfate screed, the slump flow was determined immediately after the end of the mixing operation on all samples, using the Hägermann cone with no compaction energy being supplied, in accordance with the SVB guidelines of the Deutscher Ausschuss für Stahlbeton (German Reinforced Concrete Committee) (see: Deutscher Ausschuss für Stahlbetonbau (Ed.): DAfStb—Guidelines for self-compacting concrete (SVB guidelines), Berlin, 2003). The Hägermann cone ($d_{top}$=70 mm, $d_{bottom}$=100 mm, h=60 mm) was placed centrally on a dry glass plate having a diameter of 400 mm and was filled with self-leveling calcium sulfate screed up to the level provided. Immediately after leveling had taken place or 5 min after the first contact between anhydrite and water, the Hägermann cone was taken off, held over the slumping self-leveling calcium sulfate screed for 30 seconds to allow for dripping, and then removed. As soon as the slump flow came to a standstill, the diameter was determined, using a caliper gauge, at two axes lying at right angles to one another, and the average was calculated. The slump flow is a value characteristic of the flow limit of a self-leveling calcium sulfate screed (see: Roussel, N et al.: Cement and Concrete Research, vol. 35, no. 5, (2005), pp. 817-822). As the slump flow decreases, the processing properties of the self-leveling calcium sulfate screed deteriorate.

In order to characterize the effect of the copolymer on the robustness of the self-leveling calcium sulfate screed with respect to sedimentation and bleeding (settling of water on the surface), 200 ml of the self-leveling calcium sulfate screed, after having been mixed up, were introduced into a glass cylinder with a diameter of 35 mm (see: A. Perrot et al./Cement and Concrete Research 42 (2012) pp. 937-944). After rest times of 30, 60 and 120 min, the height of the water film (bleed water) on the surface of the self-leveling calcium sulfate screed was measured. The higher the film of water on the surface of the mortar, the lower the stabilizing effect of the copolymer used. The results are summarized in table 1.

The molar mass average M of the copolymer of the invention was, as explained above, determined via the Mark-Houwink relationship (1). The parameters K and a are unknown for the present polymer-solvent pair. Therefore, the parameters for pure polyacrylamide in water were used (according to J. Klein, K-D Conrad, Makromol. Chem. 1980, 18, 227), i.e. K=0.0049 and α=0.8.

For the determination of the intrinsic viscosity [η], a 0.5% solution of the copolymer in water was prepared. This was diluted with a buffer (116.66 g NaCl+32.26 g $Na_2HPO_4*12H_2O$+1.795 g $Na_2HPO_4*H_2O$ in 2 liters of demineralized water), in order to obtain a c=0.01% polymer solution. The solution was analyzed with an Ubbelohde viscometer (at 20° C.; Ubbelohde capillary type 1). The intrinsic viscosity was determined via the run time of the 0.01% polymer solution, using the solvent without polymer as reference.

The run time (t(polymer)) of the polymer solution was determined in comparison with the pure solvent ($t_s$) as reference ($\Delta t = t(polymer) - t_s$). The intrinsic viscosity [η] can be calculated therefrom according to Solomon-Ciuta:

$$[\eta] = \sqrt{2(v_{relative}-1) - 2 ln\, v_{relative}}/c$$

with $V_{relative} = c \times v_{reduced} + 1$
and $V_{reduced} = \Delta t/(c \times t_s)$

The invention claimed is:

1. A composition comprising
   (α) at least one inorganic binder
   (β) at least one water-soluble copolymer based on
      (a) 0.1 to 20 wt % of at least one monomer of the formula (I),

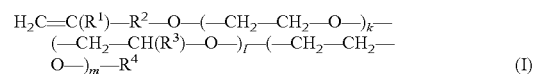

TABLE 1

Results of the performance tests

| Stabilizer | Amount added [Weight % based on anhydrite] | Slump flow [cm] | Height of water film in [mm] after | | | | Molar mass average M |
| --- | --- | --- | --- | --- | --- | --- | --- |
| | | | 0 min | 30 min | 60 min | 120 min | |
| Reference without copolymer | 0.000 | 28.4 | 0.000 | 0.042 | 0.161 | 0.289 | |
| Copolymer A based on monomer M2 (inventive) | 0.030 | 24.1 | 0.000 | 0.000 | 0.035 | 0.127 | 7.2 · 10⁶ g/mol |
| | 0.050 | 23.7 | 0.000 | 0.000 | 0.000 | 0.000 | |
| | 0.100 | 21.8 | 0.000 | 0.000 | 0.000 | 0.000 | |
| Copolymer B based on monomer M1 (comparative example) | 0.030 | 20.6 | 0.000 | 0.020 | 0.078 | 0.323 | |
| | 0.050 | 20.7 | 0.000 | 0.000 | 0.000 | 0.037 | |
| | 0.100 | 19.4 | 0.000 | 0.000 | 0.000 | 0.000 | |
| Copolymer C based on monomer M2 (comparative example) | 0.030 | 27.5 | 0.000 | 0.056 | 0.128 | 0.428 | 0.34 · 10⁶ g/mol |
| | 0.050 | 27.0 | 0.000 | 0.000 | 0.128 | 0.287 | |

The comparative example copolymer B is based on the disclosure content in U.S. Pat. No. 8,362,180 (example in column 27, line 40 to column 28, line 14 with monomer M2).

An added amount of just 0.05 wt % of the copolymer A of the invention is sufficient to stop sedimentation completely after 120 min, it being possible to achieve a good slump flow at the same time.

where the units —($CH_2$—$CH_2$—O—)$_k$, —($CH_2$—CH($R^3$)—O—)$_l$ and —($CH_2$—$CH_2$—O—)$_m$ are arranged in a block structure in the order shown in formula (I)
and the radicals have the following meanings:
k: is from 10 to 150;
l: is from 5 to 25;
m: is from 1 to 15;

R$^1$: is H or methyl;

the radicals R$^2$: are each, independently of one another, a single bond or a divalent, linking group selected from the group consisting of —(C$_n$H$_{2n}$)— and —O—(C$_n$H$_{2n'}$)— and —C(O)—O—(C$_{n''}$H$_{2n''}$)—, where n, n' and n'' are each a natural number from 1 to 6;

R$^3$: is a hydrocarbon radical having at least 2 carbon atoms or an ether group of the general formula —CH$_2$—O—R$^{3'}$, where R$^{3'}$ is a hydrocarbon radical having at least 2 carbon atoms and the radicals R$^3$ can be identical or different within the group —(—CH$_2$—CH(R$^3$)—O—)$_l$;

the radicals R$^4$: are each, independently of one another, H or a hydrocarbon radical having 1 to 4 carbon atoms, and (b) 25 to 99.9 wt % by weight of at least one monoethylenically unsaturated, hydrophilic monomer (b) different from monomer (a), where the wt % figures are in each case based on the total amount of all monomers in the copolymer and the at least one copolymer has a molar mass average M of 1 500 000 to 30 000 000 g/mol which is determined by the Mark-Houwink relationship (1)

$$M=([\eta]/K)^{1/\alpha} \qquad (1),$$

where K=0.0049, α=0.8 and [η] is the intrinsic viscosity.

2. The composition according to claim 1, wherein the inorganic binder is at least one from the series calcium sulfate n-hydrate, Portland cement, white cement, calcium aluminum cement, calcium sulfoaluminum cement, geopolymer, and latent hydraulic and/or pozzolanic binder.

3. The composition according to claim 1, wherein the index k is from 23 to 26.

4. The composition according to claim 1, wherein the index l is from 8.5 to 17.25.

5. The composition according to claim 1, wherein the radicals have the following meanings:
k: is from 23 to 26;
l: is from 12.75 to 17.25;
m: is from 2 to 5;
R$^1$: is H;
R$^2$: is a divalent, linking group —O—(C$_n$H$_{2n'}$)—, where n' is 4;
R$^3$: is a hydrocarbon radical having 2 carbon atoms;
R$^4$: is H.

6. The composition according to claim 1, wherein at least one of the monomers (b) is a monomer comprising acidic groups, the acidic groups comprising at least one group selected from the group of —COOH, —SO$_3$H and —PO$_3$H$_2$ and salts thereof.

7. The composition according to claim 1, which comprises at least two different monoethylenically unsaturated, hydrophilic monomers (b), namely
at least one neutral hydrophilic monomer (b1), and
at least one hydrophilic anionic monomer (b2) which comprises at least one acidic group selected from the group of —COOH, —SO$_3$H and —PO$_3$H$_2$ and salts thereof.

8. The composition according to claim 1, wherein the at least one copolymer is a copolymer based on
at least one monomer (a) of the formula (I), and also
acrylamide as neutral hydrophilic monomer (b1) and
acrylamido-2-methylpropanesulfonic acid (AMPS) as anionic hydrophilic monomer (b2).

9. The composition according to claim 1, wherein the component (β) further comprises (c) at least one nonionic, nonpolymerizable, surface-active component.

10. The composition according to claim 1, which comprises, based on its dry mass, at least 20 wt % of the at least one inorganic binder and 0.0005 to 5 wt % of the at least one copolymer.

11. A process for producing a composition according to claim 1, wherein the monomer (a) of the general formula (I) is prepared by a process comprising the following steps:

a) reaction of a monoethylenically unsaturated alcohol A1 of the general formula (II)

$$H_2C=C(R^1)-R^2-OH \qquad (II),$$

with ethylene oxide,
where the radicals R$^1$ and R$^2$ are as defined;
with addition of an alkaline catalyst K1 comprising KOMe and/or NaOMe; giving an alkoxylated alcohol A2;

b) reaction of the alkoxylated alcohol A2 with at least one alkylene oxide Z of the formula (Z)

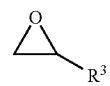

(Z)

where R$^3$ is as defined;
with addition of an alkaline catalyst K2;
where the concentration of potassium ions in the reaction in step b) is less than or equal to 0.9 mol %, based on the alcohol A2 used;
and the reaction in step b) is carried out at a temperature of less than or equal to 135° C., giving an alkoxylated alcohol A3 of the formula (III), $$H_2C=C(R^1)-R^2-O-(-CH_2-CH_2-O-)_k-(-CH_2-CH(R^3)-O-)_l-H \qquad (III)$$

where the radicals R$^1$, R$^2$, R$^3$, k and l are as defined;

c) reaction of the alcohol A3 with ethylene oxide; giving an alkoxylated alcohol A4 which corresponds to the monomer (a) of the formula (I) where R$^4$=H and m=1 to 15;

d) optionally etherification of the alkoxylated alcohol A4 with a compound $$R^4-X$$

where R$^4$ is a hydrocarbon radical having 1 to 4 carbon atoms and X is a leaving group, optionally selected from the group consisting of Cl, Br, I, —O—SO$_2$—CH$_3$ (mesylate), —O—SO$_2$—CF$_3$ (triflate) and —O—SO$_2$—OR$^4$;

giving a monomer (a) of the formula (I) where R$^4$=hydrocarbon radical having 1 to 4 carbon atoms.

12. A process for producing a composition as claimed in claim 1, wherein the copolymer is prepared by subjecting at least one monomer (a) and at least one hydrophilic monomer (b) to an aqueous solution polymerization.

13. The process according to claim 12, wherein the solution polymerization is carried out at a pH in the range from 5.0 to 9.

14. The process according to claim 12, wherein the solution polymerization is carried out in the presence of at least one surface-active component (c).

15. A process comprising utilizing the copolymer of component (β) as rheological additive in a composition according to claim 1.

\* \* \* \* \*